United States Patent
Saadat

(10) Patent No.: US 8,191,594 B2
(45) Date of Patent: Jun. 5, 2012

(54) WHEEL AXLE AND DRIVE OR UNIVERSAL SHAFT FOR VEHICLES WITH A CENTRAL TYRE PRESSURE SUPPLY

(75) Inventor: Fereshteh Saadat, Soest (DE)

(73) Assignee: M. Mohsen Saadat, Soest (DE)

( * ) Notice: Subject to any disclaimer, the term of this patent is extended or adjusted under 35 U.S.C. 154(b) by 144 days.

(21) Appl. No.: 12/521,784

(22) PCT Filed: Feb. 2, 2008

(86) PCT No.: PCT/DE2008/000188
§ 371 (c)(1),
(2), (4) Date: Jun. 30, 2009

(87) PCT Pub. No.: WO2008/095470
PCT Pub. Date: Aug. 14, 2008

(65) Prior Publication Data
US 2010/0065177 A1   Mar. 18, 2010

(30) Foreign Application Priority Data
Feb. 6, 2007   (DE) .................. 10 2007 005 765

(51) Int. Cl.
*B60C 23/10* (2006.01)
(52) U.S. Cl. ...................................... 152/417
(58) Field of Classification Search .......... 152/415–417; 137/223, 614.04, 580
See application file for complete search history.

(56) References Cited

U.S. PATENT DOCUMENTS

| | | | |
|---|---|---|---|
| 4,765,385 A | | 8/1988 | McGeachy |
| 5,979,526 A | * | 11/1999 | Chamoy .................. 152/417 |
| 6,206,040 B1 | * | 3/2001 | Smith, III .............. 137/614.04 |
| 6,394,131 B1 | * | 5/2002 | Fross et al. .............. 137/614.05 |
| 6,651,689 B1 | * | 11/2003 | Stech ........................ 137/223 |
| 7,273,082 B2 | * | 9/2007 | White et al. ................ 152/417 |
| 7,416,005 B2 | * | 8/2008 | Hennig et al. ............. 152/417 |
| 2005/0263193 A1 | * | 12/2005 | Carmack et al. ......... 137/614.04 |
| 2007/0277887 A1 | * | 12/2007 | Imler et al. ............. 137/614.04 |

FOREIGN PATENT DOCUMENTS

| | | |
|---|---|---|
| CH | 296220 A | 1/1954 |
| DE | 69204527 T2 | 2/1996 |

* cited by examiner

*Primary Examiner* — Jason Bellinger
(74) *Attorney, Agent, or Firm* — McNeely, Hare & War LLP; James E. Mrose

(57) ABSTRACT

A wheel axle system for vehicles with a central tire pressure supply through a bore in the wheel axle. The invention includes a first wheel component removably coupled to a second wheel component, and a seal therebetween. The first wheel component includes a first mechanical valve, a coaxial circumferential groove, and an axial bore defined in the first component. The circumferential groove is located at a wheel side end of the axial bore. The second wheel component has a second mechanical valve, and a coaxial circumferential groove facing the circumferential groove of the first wheel component. The second mechanical valve co-acts with the first mechanical valve. The seal is interchangeable placed in the circumferential groove of the first and second wheel components, and acts as a coupling member between the first and second wheel components which revolve in relation to one another.

5 Claims, 3 Drawing Sheets

WHEEL AXLE AND DRIVE OR UNIVERSAL SHAFT FOR VEHICLES WITH A CENTRAL TYRE PRESSURE SUPPLY

CROSS-REFERENCE TO RELATED APPLICATIONS

This application is an U.S. national phase application under 35 U.S.C. §371 based upon co-pending International Application No. PCT/DE2008/000188 filed on Feb. 2, 2008. Additionally, this U.S. national phase application claims the benefit of priority of co-pending International Application No. PCT/DE2008/000188 filed on Feb. 2, 2008 and German Application No. 10 2007 005 765.4 filed on Feb. 6, 2007. The entire disclosures of the prior applications are incorporated herein by reference. The international application was published on Aug. 14, 2008 under Publication No. WO 2008/095470 A1.

BACKGROUND OF THE INVENTION

1. Field of the Invention

The invention relates to a wheel axle and drive shaft or universal shaft for vehicle wheels with automatic pressure medium feed and discharge by way of the vehicle, where the pressure medium, air or other gases, during the motion of the vehicle is fed to the wheels by the vehicle itself, the tire pressure being regulated by the on-board computer.

2. Description of the Prior Art

Wrong tire pressure in the wheels results in heating and eventually in bursting of the tires. If the tire bursts at high velocity, increased risks of accidents arise. In addition, each of the tires, as a function of the road surface, load condition, ambient temperature, tire size, type of tire and weather conditions, requires a different tire pressure. In some countries the indication and control of the tire pressure condition has meanwhile become obligatory.

For more than 100 years, motor vehicles have been constructed with tires filled with compressed air. Efforts in this art to have the tire pressure regulated by the vehicle itself whilst in motion are known from numerous patent applications. In general, the solution attempts show two different principles. Whereas the first group of inventors endeavors to produce a permanent connection between the tire pressure and the compressed air on the vehicle side, the second group switches this connection on and off whenever required in order to reduce as much as possible the wear of valves and sealing means. In addition, in almost all of the solution attempts, it is endeavored to pass the air from fixed parts of the vehicle by way of radial passages into the revolving parts and to seal these passages on both sides by known radial sealing gaskets. This causes an increase in the number and the length of the sealing areas, and thereby also the friction and wear. It is important to note that attempts to date to solve this problem have not attained any breakthrough. All of them have failed to solve the problem completely, simply and in an adequately reliable manner, for which reason they have not to date attained production status and large scale production.

Thus, DE 697 04 067 T2 discloses a driven universal shaft, which, only when supplementation is needed, feeds the compressed air radially by way of a sealing unit specially designed for this purpose from one side only, i.e. only in the direction towards the non-return valve of the tire in the centre of the wheel rim. The revolving wheel hub itself has no valve. This system offers the advantage that, in the pressureless state, it is not subjected to friction or wear. It operates according to a principle similar to that of a disc brake which, in the absence of pressure, makes no contact with the revolving part. However, the disadvantages of this system are enormous. It has numerous, at least ten, complicated components. Initially, it allows much air to escape before the membrane couplings respond and cause sealing of the sealing surfaces. It requires maintaining predetermined geometrical conditions in order for the force onto the surface of the sealing elements to exceed the force which endeavors to lift the sealing elements and last but not least this system forwards the air to the tire only in one direction and requires very extensive assembly and dismantling work.

DE 40 29 311 C2 discloses a method for solving the set objective. In this method, the compressed air is forwarded by way of radial passages (19) of the revolving universal shaft and from there by way of oblique radial and axial bores (20) to a valve connected on one side to the universal shaft and on the other side to the pneumatically activated valve connected to the tire duct (40). This method has the advantage that it connects only when required, i.e. intermittently the tire air space to the source of air of the vehicle for regulating purposes. Operation of the operating valve (3) proceeds pneumatically by impulses by way of the existing compressed air and, accordingly, requires no additional ducting with slip rings to the revolving wheel hub (27). This method suffers from the following disadvantages: For sealing the air passage two static and two dynamic radial sealing rings (42) as well as additional mechanical components are required. The operating valve (3) is permanently connected to the wheel hub. The tire tube (40) is screwed under tire pressure to the operating valve. When changing wheels, e.g. from winter- to summer tires and vice versa, the tire tube (40) must be separated from the valve (3), whereby the tire is emptied. In addition, the externally positioned tube represents a hazard as well as an unbalance.

DE 36 19 603 A1 discloses a fixed wheel axle (5) including a pneumatically operated coupling unit (9, 11) integrated with and alongside the wheel axle and which, when required, connects to the valve body placed centrally on the wheel rim and supplies the tire by way of the externally positioned duct (14) with compressed air. The coupling (9, 11) is made of a sealing material such as rubber and is fitted on the wheel side to the piston rod, through which a bore passes, of a pneumatically operated cylinder-piston-unit which is connected downstream of a differential pressure valve (24). A stated advantage of this system is that, in normal vehicle operation, no contact and therefore also no wear takes place. Shortly prior to the start, i.e. while the vehicle is stationary, after the key has been inserted into the ignition, the piston rod (6) with its bore, is moved by the pneumatic pressure against the piston surface (19) in opposition to the force of the resetting spring (18) towards the tire valve (12, 13), making air-tight contact therewith and causing the tire to be filled with the same compressed air which caused the coupling of the piston rod to the tire valve. Disadvantages of this system include the fact that, firstly, it involves a stationary, i.e. non-driven wheel axle, for which reason the compressed air regulation is to take place prior to starting the vehicle, i.e. whilst stationary. Furthermore, nothing is said about the actual problem of the interaction of the coupling head (9, 11) with the valve body (12, 13). How much pressure is to be applied to the coupling at this locality for sealing to be achieved? This pressure, including the pressure required for overcoming the friction in the sealing rings of the piston rod (6) with sufficient pressure for overcoming the force of the resetting spring (18) must not be more than the minimum tire pressure. Otherwise it will not be possible to reduce or to regulate the tire pressure, because this takes place by way of a single air passage. Moreover, the axle must be drilled through sufficiently far to accommodate the axially movable piston rod (6) and cause it to enter into axially movable sealing engagement with the sealing elements (18). The aforesaid disadvantages of this system are so great that a reliable function cannot be assured. For that reason, this system as well has not been proven successful in practice.

EP 1 738 936 A1 discloses a combined unit comprising a roller bearing set, the hollow centre of which is used for feeding compressed air to the wheel and tire. The sheet metal cover (50) which closes the bearing unit is referred to as an element of compressed air feeding, without its sealing function against a valve and hose (A, B) connected thereto being in any way explained. This publication relates to a bearing unit and does not solve the object of inter-connection. For as long as roller bearings have existed, these have always had a hollow centre portion, which could be used for any other purpose. It is with great astonishment that here a bearing unit with a hollow centre portion has been patented. The question arises as to inventive level and effort!

PCT/SE 99/01574 (WO 00/15451 A1) discloses feeding compressed air to a tire by way of a ring (4.1) which is fitted on the outside to the end face of a wheel (1). What is disclosed here relates to a revolving wheel of a tractor, the large wheel hub (3) of which is stationary and offers much room for the passage therethrough and fixing of components (5). The revolving ring (4.1) comprises an axial groove, in which a stationary seal is accommodated which conducts the compressed air to the revolving part of the vehicle wheel from the stationary component (6), which is fitted by means of a clamp outside of the vehicle, to the wheel axle. The stationary ring (6) is centered by means of the roller bearing (4.9) in relation to the wheel (4.1, 4.2) and is held on the axle by the member (5.1). This principle is presumably suitable for slowly travelling vehicles such as tractors, even though it is very expensive. A considerable disadvantage resides, however, in the large number and the very large diameter of the components involved in solving the object and in the arrangement on the outside of the vehicle wheel. The large diameter of the seal and the stripper (4.11) as well as the large roller bearing (4.9) suffice to render this system very expensive. Moreover, this principle is completely unsuitable for road vehicles such as passenger motor vehicles, because non-revolving components must be fitted to the outside of the wheel, which present a hazard for people, quite apart from the fact that driven wheels possess no fixed portion to which the stationary ring (6) could be fitted.

SUMMARY OF THE INVENTION

As compared with the aforegoing, it is an object of the invention to feed the pressure medium, during travel, on the vehicle side to the tire of the driven as well as the non-driven wheels and to do so consistently and uniformly with a minimum of space and component requirement as well as a minimum of frictional moment in such a manner that a wheel interchange between the driven and the non-driven wheels is possible. In this context, neither the wheel axis nor the drive shaft within the wheel hub should be weakened appreciably or require more space, and during assembly or dismounting the wheels, compressed air should neither escape from the wheel nor from the vehicle.

All above mentioned requirements or objects are attained very easily, clearly and reliably due to the bore passing axially and in the neutral phase through the wheel axis and the drive or universal shaft having at the end of the axial bore in or following onto the wheel nut, a centrally placed commercially available compressed air feed and non-return valve connected to a coupling element, co-axially arranged around the valve and consisting of an axial or radial groove for a dynamically or statically sealing gasket.

In its most simple embodiment a wheel axle and drive or universal shaft is provided centrally along the axis of rotation of the wheel with an axial bore and conducts the pressure medium from the vehicle side through the axial bore to a preferably commercially available compressed air valve, the so-called axle valve, which is fitted interchangeably at the end of the axial bore in the wheel axle and the drive or universal shaft, preferably within or following onto the wheel nut, to the axial bore and co-acts with a similar valve in the centre of the wheel hub, the so-called wheel valve, passively, i.e. without externally introduced energy.

In the non-mounted state of the wheel, the axle valve takes care that no pressure medium escapes from the wheel axle and drive shaft or universal shaft. In the same manner, the wheel valve takes care that no air can escape from the tire.

After the wheel has been mounted, the valve needle of the wheel valve accommodated in the wheel hub of the wheel, presses against the valve needle of the axle valve, causing both blocking forces which result from the spring force and the air pressure to mutually cancel each other and to open both valves. The valve needle points of the two valves, the axial valve and the wheel valve are so configured, that they offer each other mutual support and during their rotational movement in relation to one another, provide very little friction and wear. This may preferably be brought about in the form of concave or convex or alternatively positively and negatively conically shaped needle heads which inter-engage and thereby provide a bearing with little wear and friction.

In order to prevent escape of the pressure medium sideways of the valve, the wheel axles as well as drive- or universal shafts, on their end face facing the wheel, are each provided with a coupling half which, when the wheel is fitted onto the wheel hub, couples onto the coupling half of the wheel in the centre of the wheel hub. Each coupling element consists of a groove which is co-axial in relation to the axis of rotation, and in which a dynamic or static axial- or radial seal is accommodated. This groove may be provided axially on the face-side as well as on a small shoulder as an external groove or in a rebate on the face side as an internal groove.

If the fixed wheel axle on its face side around the axle valve has an axial groove, a dynamic axial seal inside thereof causes sealing in conjunction with the sealing lips in the direction of the axis of rotation in relation to a groove corresponding to the former or a plane surface on the revolving wheel or in the wheel hub.

In the event that the fixed wheel axle has co-axially about its axle valve a small shoulder or a small rebate with a circumferential outer- or inner groove, a dynamic radial seal having co-axial sealing lips in relation to the axis of rotation causes sealing in relation to a matching rebate or shoulder in the revolving wheel or wheel hub.

In the event that the revolving drive or universal shaft on its face side has an axial groove about its axle valve, a static axial seal inside of the former forms a seal against an opposite positioned axial groove or plane surface on the co-revolving wheel or in the wheel hub.

In the event that the revolving drive or universal shaft has co-axially about its central valve a small shoulder or a small rebate with an external groove or interior groove provided on its cylindrical circumference, a static radial seal causes sealing against a rebate, corresponding to the shoulder or against a shoulder corresponding to the rebate in the co-revolving wheel or wheel hub.

According to an advantageous embodiment of the invention, the axle valve is fixed in a small shoulder of a separate part serving as valve carrier having two different diameters in the manner of a piston-piston rod-unit which, in the axial bore of the axle and of the drive- or universal shaft is provided axially movably to a limited extent and is radially sealed in relation to the wheel axle and the drive shaft at its two localities of different diameters, the space between the two seals being connected to atmospheric pressure by way of a small bore.

The valve carrier is preferably inserted, serving as a cylinder body in sealing relationship with but axially movably into a second axially symmetrical component, which appropriately also contains the sealing surface of the seal between the wheel axle or drive shaft and the wheel or wheel hub. On the circumference of the two shoulders between the valve carrier, serving as piston-piston rod unit, and its cylindrical holder, is provided for each of these a small piston or piston rod seal, which prevents compressed air entering sideways into the interstice between the two piston or piston rod seals and which is connected to the atmosphere.

For as long as the tire pressure regulating system of the vehicle or the compressed air source is shut off, the wheel valve presses onto the axle valve and pushes the axle valve back by means of the axially movable valve carrier serving as a piston rod. This causes closure of the wheel valve. If the tire pressure regulating system of the vehicle is switched on, this first causes filling of the space preceding the piston of the valve carrier. The pressure builds up in this space and pushes the valve carrier including the valve outwardly towards the wheel valve. Regulating of the tire pressure proceeds after the two valves, i.e. the axle- and the wheel valve have become coupled.

The equilibrium of forces acting on the valve carrier is brought about by the spring force of the valve plus the tire pressure, multiplied by the cross sectional area of the smaller shoulder on the valve carrier on the one side and the prevailing pressure on the cross sectional area of the larger shoulder on the valve carrier on the other side of the valve carrier acting as an axially movable piston. By appropriate selection of the spring force of the two valves, which advantageously is identical, and the selection of the difference in diameters of the two shoulders on the valve carrier, it is possible to determine the minimum pressure at which the valve body will move axially away from the wheel valve, allowing the wheel valve to close. This pressure corresponds to the minimum tire pressure.

A thus conceived valve and sealing unit can be manufactured as a turned component independently of the wheel axles and drive shafts and be installed subsequently in the duly prepared wheel axles and drive shafts. It can also be manufactured of a material different from the material of the wheel axle and the drive shaft.

On the vehicle side, the pressure medium, air, gas or other media, enters while the wheel axle is fixed through a resilient hosepipe on the fixed connection of the axial bore of the wheel axle leading to the axle valve. In the case of the driven wheels the drive- or universal shaft, as a rule, has a plurality of shoulders. The pressure medium enters on the vehicle side preceding the wheel bearing by way of a radial bore on the circumference of a shaft shoulder, preferably between the articulated head and its bearing unit, into the axial bore of the revolving drive- or universal shaft and from there to the axle valve. The radial bore is sealed either on both sides by shaft sealing rings or by way of a radially bored dynamic seal thereabove and having four sealing lips.

According to a more advantageous solution, the pressure medium on the vehicle side enters through a quad ring having a passage drilled parallel to the axis of rotation and which is placed in a groove on the end face side of a labyrinth seal between the shaft shoulder of the drive or universal shaft and the wheel suspension, into a radial bore and from there through the axial bore of the drive or universal shaft to the axle valve.

The advantage of this dynamic sealing method resides in that only a single seal having four sealing lips is used, which is floatingly placed into mutually opposite axial grooves on the face side between the revolving drive or universal shaft and the fixed wheel suspension. This trans-bored dynamic axial sealing means can be replaced by releasing the wheel nut and disconnecting the drive shaft. Further labyrinths above the seal prevent by centrifugal force of the revolving shaft, the entrance of dirt and foreign bodies into the seal. The axial seal may also be fixed in relation to one of the two parts and provide dynamic sealing against a plane surface of the other part.

In the case of a wheel axle and drive or universal shaft constructed in accordance with the invention, the wheel bearing and the wheel hub remain untouched. The wheels of the driven shafts can be interchanged any time against those of the non-driven axles.

BRIEF DESCRIPTION OF THE DRAWINGS

In detail there is shown in.

Identical components are denoted by the same reference number. Different indices or letters denote different regions or different designs or the multiple provision of the same element at different localities.

DESCRIPTION OF THE PREFERRED EMBODIMENT

Figure 1:
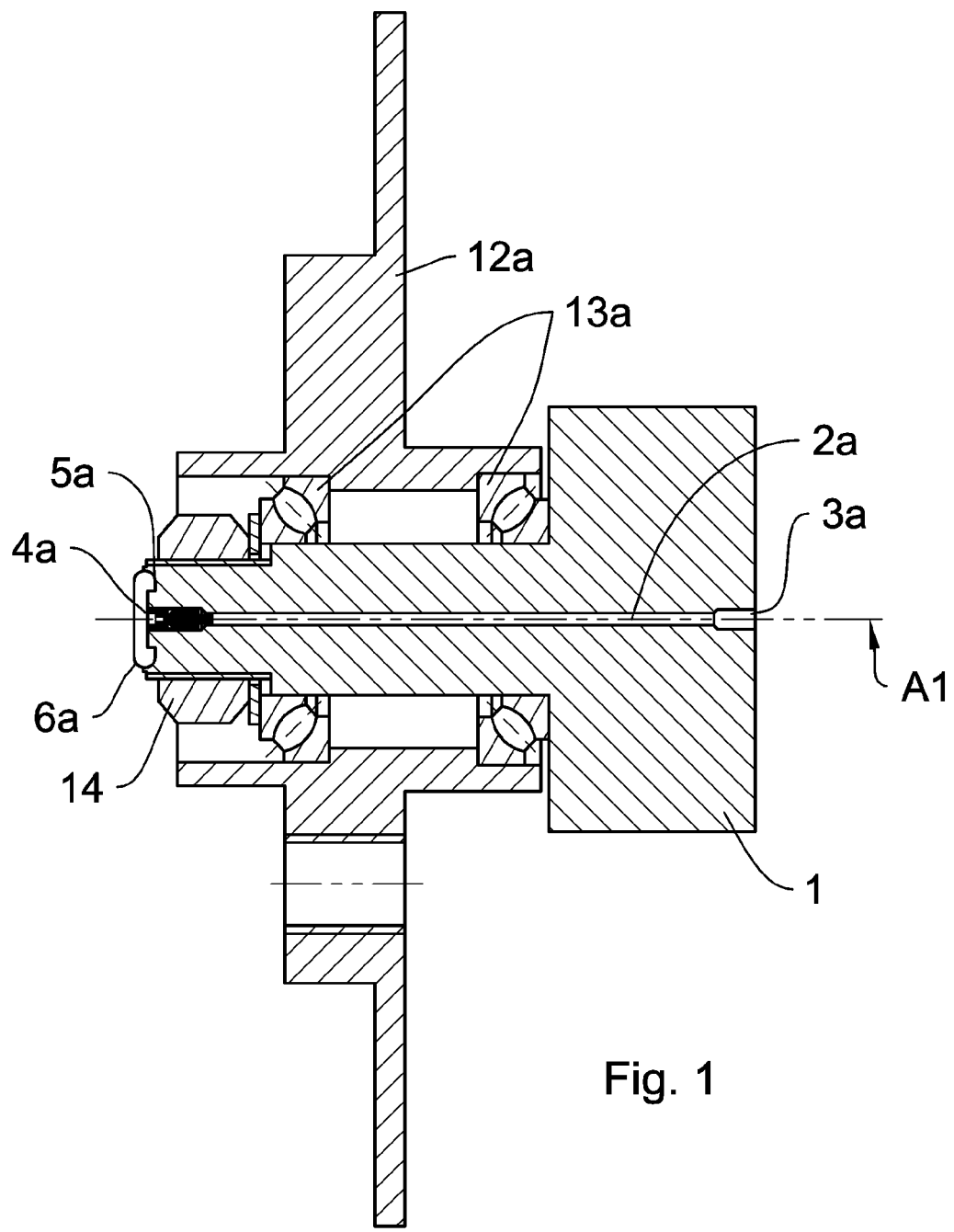
FIG. 1 the cross-sectional view through the fixed wheel axle according to the invention including a central bore and a valve unit at the end of the bore directed towards the wheel, and a coupling element which is coaxial in relation to the axle valve, comprising an axial groove including a dynamic axial seal provided therein.

FIG. 1, shows a fixed wheel axle (1), according to the invention, which in its neutral phase, on the axis of rotation ($A_1$) includes an axial bore (2a). At the end on the vehicle side of the axial bore (2a) there is provided the fixed connection (3a) for feeding compressed air by means of an elastic hose pipe. At the wheel side end of the axial bore (2a) a non-return valve (4a) is fitted interchangeably. In annular relationship around the axle valve (4a), an axial groove (5a) is provided on the face side of the fixed wheel axle (1), having located therein a U- or quad ring-shaped, dynamic axial seal (6a), preferably in floating relationship, which seals the wheel axle (1) by means of a groove matching therewith provided on the revolving wheel or in the wheel hub. The wheel, not shown, is fitted onto the shoulder of the wheel hub (12a) and bolted thereto. The wheel hub (12a) is mounted on the wheel axle (1) by means of a roller bearing (13a) and secured by means of the self-locking wheel nut (14). It is also possible for the wheel axle (1) to be sealed against the wheel by means of a radial sealing ring. In that case, the radial sealing ring is seated in a circumferential groove on a small shoulder at the wheel side end of the wheel axle (1), co-axially in relation to the axle valve, in a recess or rebate of the wheel hub. The radial sealing ring likewise provides a dynamic seal.

The groove (5a), jointly with the seal (6a), forms an axial coupling element, being one half of a coupling, the second half of which is provided on the wheel or in the wheel hub. The coupling element may also be of radial design as described in FIG. 2.

The seal (6a) of the coupling is a dispensable component and therefore subject to abrasion. It may be fitted in the coupling part of the wheel hub or the wheel axle and drive- or universal shaft and be replaced whenever a wheel is changed, i.e. at least twice a year.

The needle heads of the two co-acting valves, the axle valve (4a) and the wheel valve (4b) are so designed that they support each other and after being assembled, cancel their spring loaded blocking effect. This may, for example, be brought about by a ball and socket shaped or conically shaped design of the co-acting needle heads and needle points, preferably made of hardened materials, as in a universal joint.

Figure 2:
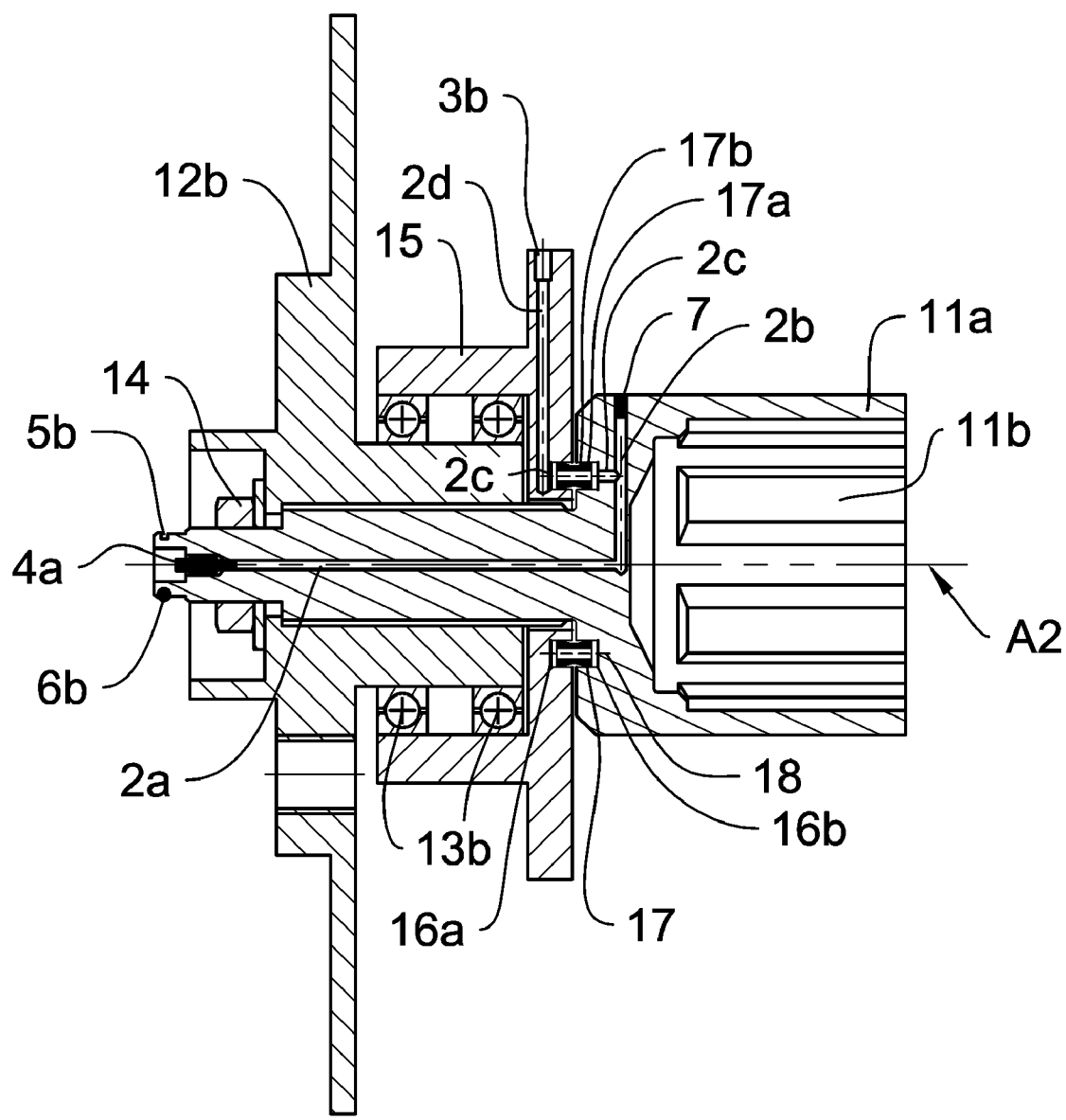
FIG. 2 the cross-sectional view through the revolving drive shaft or universal shaft according to the invention of a driven or optionally also steered wheel, including a labyrinth seal on the face side and a central bore as well as a valve unit, placed on the wheel-side end of the drive or universal shaft including a coupling element which is co-axial in relation to the axle valve, comprising an external groove on a small shoulder of the shaft and a static radial seal in the groove.

According to FIG. 2, a drive shaft (11a) or universal shaft (11b) provided according to the invention with an axial bore (2a) therethrough, is bolted onto the wheel hub (12b) with the aid of tooth formations by means of the self-locking wheel nut (14). The wheel hub (12b) is rotatably mounted in the wheel suspension (15) by means of roller bearings (13b).

The axis of rotation ($A_2$) of the drive- or universal shaft (11a, 11b) has a passage (2a) bored therethrough. The pressure medium enters from the vehicle side through elastic hosepipes by way of the connection (3b) into the fixed wheel suspension (15) on which also the brake caliper, not shown, is fitted, through the radial bore (2d) and axial bore (2c) of the wheel suspension (15) to the dynamic axial seal (17). The dynamic axial seal (17) is designed like a quad ring with four sealing lips (17a) and a connecting web (17b), and provided with an axial bore (18) between the coaxial sealing lips. It is located axially floating by way of two sealing lips on both sides of the bores (18) in a groove (16b) provided on the face side of a small shaft shoulder on the drive or universal shaft on the one side and a corresponding groove (16a) in the wheel suspension (15) on the other side. From there the pressure medium passes first through the axial bore (2c) and thereafter through the radial bore (2b) into the axial bore (2a) of the drive or universal shaft (11a, 11b) and from there to the axle valve (4a) which is interchangeably fitted to the end of the bore (2a). From the axle valve (4a) the pressure medium passes by way of the wheel valve (4b) into the wheel, not illustrated here, which is fixed to the revolving wheel hub (12b).

The stopper (7) closes the open bore (2b) which exists for manufacturing reasons.

The revolving drive or universal shaft (11a, 11b), jointly with the wheel hub (12b), is mounted by means of a bearing set (13b) in the wheel suspension (15) and is secured by means of the self-locking nut (14). The drive shaft is provided on the wheel side coaxially about the axle valve (4a) with a small shoulder having an external groove (5b) and a static radial seal (6b) which, together, constitute a coupling element, in this case a coupling nipple. This coupling element serves for coupling the drive or universal shaft (11a, 11b) to the other coupling element of the wheel to complete the coupling. The second and complementary coupling element, in this case a coupling socket of the coupling, is provided on the wheel or in the wheel hub. It stands to reason that the functions of the two coupling elements, nipple and socket, in relation to their association with the drive or universal shaft (11a, 11b) and the not illustrated wheel hub can be interchanged if this appears more appropriate for purposes of manufacture, stock-keeping or handling and assembly.

Because of the interchangeability of the wheels between a non-driven and a driven wheel hub (12a, 12b) it is preferred to provide uniformly a dynamic axial or radial seal in the coupling around the axle valve (4a).

Figure 3:
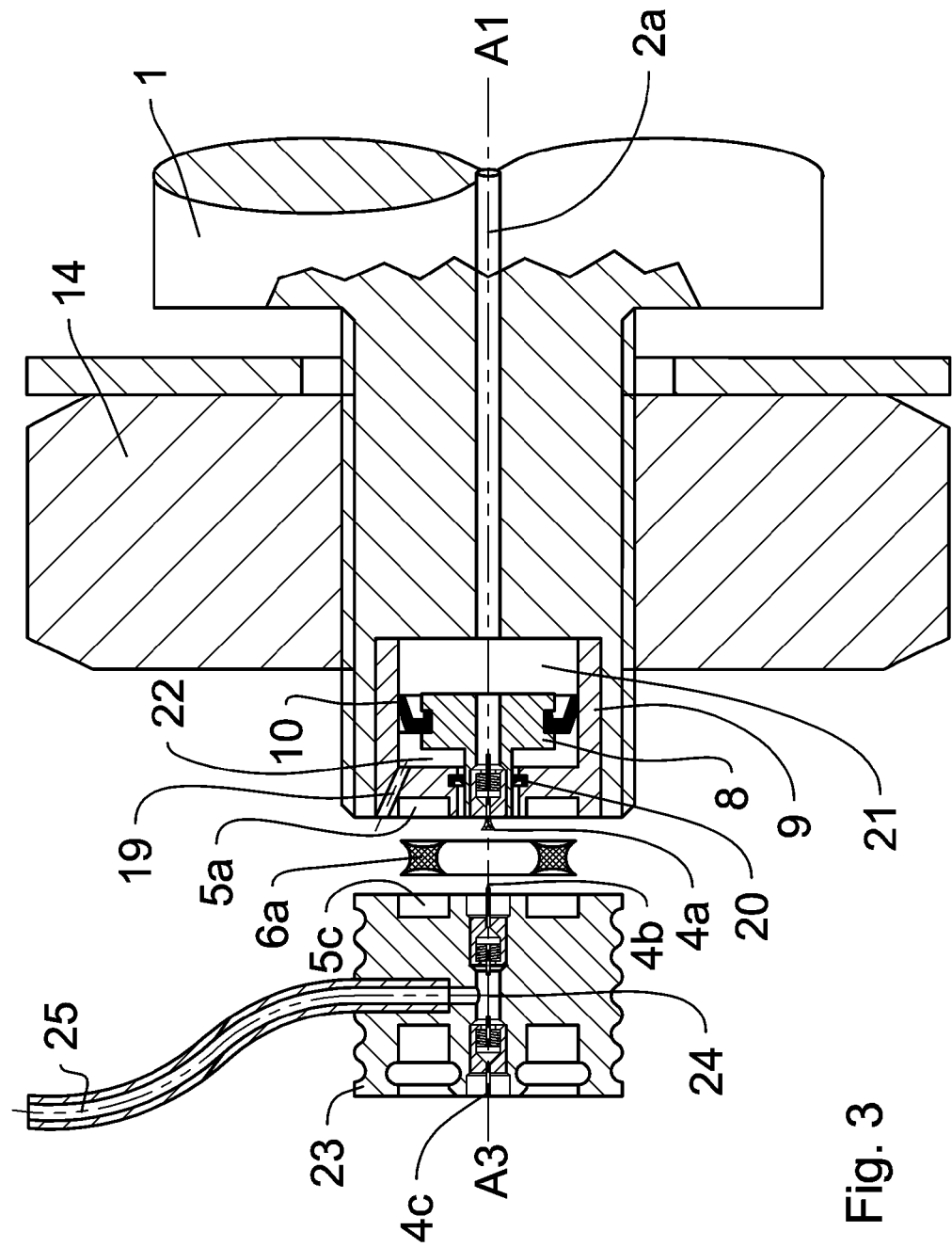
FIG. 3 the cross-sectional view through a wheel axle according to the invention of a vehicle including an axially movably arranged axle valve, an axial seal for coupling to the wheel hub and a wheel valve which corresponds with the axle valve.

In accordance with FIG. 3, an axle valve (4a) which is screwed into the cylindrical valve carrier (8) is provided on the end on the wheel side of the wheel axle and drive- or universal joint (1) through which a passage is bored. The valve carrier (8) comprises two shoulders having different diameters, fitted like a piston to a piston rod and seated axially movably in a preferably cylindrical hollow body (9) which, on its inside for the close fitting accommodation of the valve carrier (8), in analogy to the latter, bears two differently sized turned rebates. At the circumference of the two shoulders, between the two parts, the valve carrier (8) and the hollow body (9), each is provided respectively with a piston seal (10) and a rod seal (20) which prevent pressure medium from entering into the space (22) between the two shoulders. The space (22) between the two shoulders and seals (10, 20) is connected by a small bore (19) to the atmosphere, i.e. being at atmospheric pressure. The hollow body (9) is inserted in sealing relationship, preferably interchangeably, in a turned out rebate of the wheel axle (1), ahead of the wheel nut (14), in order not to weaken the axle. The hollow body on its wheel side end face, is provided with an axial groove (5a), serving for accommodating a dynamic or static seal (6a). Between the valve carrier (8) and the vehicle side end of the hollow body (9), the cavity (21) is provided, which serves for the axial movement of the valve carrier (8). In the active state of the vehicle-tire pressure regulating system, compressed air prevails in the axial bore (2a). The compressed air exercises pressure onto the larger face side of the valve carrier (8) and pushes the latter by way of the axle valve (4a) outwardly until it engages the wheel valve (4b). If the wheel is not mounted, the axle valve (4a) remains closed and the tire pressure regulating system of the vehicle remains sealed.

Opposite to the axle valve (4a), a wheel hub (23) in a disconnected condition is provided, including a wheel valve (4b) which is likewise closed and does not allow the tire air to escape, and an axial groove (5c) serving for accommodating the dynamic or static seal (6a). In the wheel hub (23), opposite to the wheel valve (4b), a further wheel valve (4c) may optionally be provided, for controlling and regulating the tire pressure when needed, also manually, from outside. The wheel valves (4b, 4c) are connected by the passage (24) to the pipe ducting (25) in the wheel or wheel stalk and thereby to the wheel bed and tire interior.

After mounting the wheel to the wheel axle, the valve needle of the wheel valve (4b) couples to the valve needle of the axle valve (4a). The valve needles mutually cancel their respective spring forces and open the two valves (4a, 4b). This causes the tire interior to be connected to the pressure medium of the vehicle-tire pressure regulating system. The free space in the interior of the wheel hub around the two valves (4a, 4b) is sealed in the case of the wheel axle by a dynamic seal and in the case of the drive and universal shaft by a static seal (6a) where the diameter is smallest.

On the vehicle side, that force acts onto the valve carrier (8), which is exercised by the pressure in the axial bore (2a) onto its end face inside the hollow space (21). On the wheel side, the spring force of the axle valve (4a) as well as the force which the tire pressure exercises onto the small end surface of the valve carrier (8), acts onto the valve carrier (8). As long as the force on the vehicle side onto the larger surface of the valve carrier (8) exceeds the force on the wheel side, the valve carrier (8) remains stationary against the left-hand side abutment and both valves (4a, 4b) are open, and the vehicle is enabled to regulate the tire pressure. Once the pressure on the vehicle side drops below a predetermined value, such as e.g., 1 bar=0.1 N/mm.sup.2=10.sup.5 Pa or 15 psi, the valve carrier (8) moves in the direction of the axial bore (2a) and the wheel valve (4b) closes automatically. Accordingly, by the selection of the diameters of the two shoulders, representing the piston and piston rod diameters of the valve carrier (8), it is possible to determine the minimum pressure in the tire at which the wheel valve (4b) closes automatically and no longer allows the tire pressure to be reduced any further. If the pressure on the vehicle side is closed off suddenly, the wheel valve (4b) will close immediately and maintain the tire pressure at a constant level. In this manner the tire pressure regulating system of the vehicle may be rendered active only when required from time to time. This is, for example, appropriate where the vehicle is not used for prolonged periods in order not to damage the tires and not to accelerate ageing or flexing. Defective sealing or leakage in the system will not adversely affect the tire pressure.

The features of the invention disclosed in the description, the drawings and the claims may be of importance for practicing the invention, both individually as well as in optional combinations. All disclosed features are important for the invention.

The invention claimed is:

1. A wheel and axle system for vehicles with a central tire pressure supply through a bore in a wheel axle, said wheel and axle system comprising;
    a first wheel component having a first mechanical valve including a valve needle head, a coaxial circumferential groove, and an axial bore defined in said first component, said circumferential groove being located at a wheel side end of said axial bore, said needle head having a spring loading-imparted blockage effect;
    a second wheel component having a second mechanical valve including a valve needle head, and a coaxial circumferential groove facing said circumferential groove of said first wheel component, said second mechanical valve co-acts with said first mechanical valve, said needle head of said second mechanical valve having a spring loading-imparted blockage effect; and
    a dynamic seal interchangeably placed in said circumferential groove of said first and second wheel components, said dynamic seal acts as a coupling member between the first and second wheel components which revolve in relation to one another;
    wherein said second mechanical valve being provided in said second wheel component such that, after mounting of a wheel thereon, said valve needle heads of said first and second mechanical valves mutually cancel said spring loading-imparted blockage effect of said first and second mechanical valves respectively;
    wherein air in a tire is in communication with a compressed air source of said vehicle.

2. The wheel and axle system according to claim 1, wherein said first mechanical valve is fixed to a valve carrier, said valve carrier being axially movably mounted in a cylindrical hollow body at a first locality and a second locality of differently sized diameters, said valve carrier being radially sealed in relation to said first and second localities in such a manner that no pressure medium enters into a hollow space between a first seal of said first locality and a second seal of said second locality, said hollow space being connected to atmospheric pressure through a bore defined through said hollow body.

3. The wheel and axle system according to claim 1, wherein said dynamic seal further comprising sealing lips being coaxially positioned, a connecting web, and an axial bore defined through said dynamic seal, said sealing lips being a pair of sealing lips, said connecting web being between two coaxial pairs of said sealing lips, and wherein a pressure medium flows from a fixed wheel suspension by way of said axial bore of said dynamic seal, which is floatingly mounted into said axial bore of said first wheel component.

4. The wheel and axle system according to claim 1, wherein said first wheel component is a wheel axle, and said second wheel component is a wheel hub.

5. The wheel and axle system shaft according to claim 1, wherein said first wheel component is a drive shaft, and said second wheel component is a wheel suspension.

* * * * *